T. MEEHAN.
SPRING WHEEL.
APPLICATION FILED MAR. 21, 1917. RENEWED SEPT. 30, 1919.

1,323,895.

Patented Dec. 2, 1919.

Thomas Meehan
Inventor

By Geo. P. Kimmel
Attorney

UNITED STATES PATENT OFFICE.

THOMAS MEEHAN, OF MASON, NEVADA.

SPRING-WHEEL.

1,323,895.     Specification of Letters Patent.     Patented Dec. 2, 1919.

Application filed March 21, 1917, Serial No. 156,381. Renewed September 30, 1919. Serial No. 327,475.

*To all whom it may concern:*

Be it known that I, THOMAS MEEHAN, a subject of the King of England, and resident of Mason, in the county of Lyon and State of Nevada, have invented certain new and useful Improvements in Spring-Wheels, of which the following is a specification.

The present invention relates to spring wheels and it is the dominant object of the invention to provide a wheel having a cushion tire, whereby the same will fully absorb such shock as may be imparted thereto during operation.

Another object of the invention is to provide a segmental tire for the wheel in order that the flexing of the same, at the direct point of strain will be permitted.

Among other aims and objects of the invention may be recited the provision of a wheel of the character mentioned with a view to compactness, and in which the number of parts are few, the construction simple, the cost of production small, and efficiency and operation high.

The improvements in the details and arrangements of parts will be apparent from an inspection of the accompanying drawings, in connection with the specific description hereinafter contained, and wherein the preferred embodiment of the invention is disclosed for the purpose of imparting a full understanding of the same.

In the drawings.

Similar characters of reference are employed in all of the above described views to indicate corresponding parts.

Figure 1:
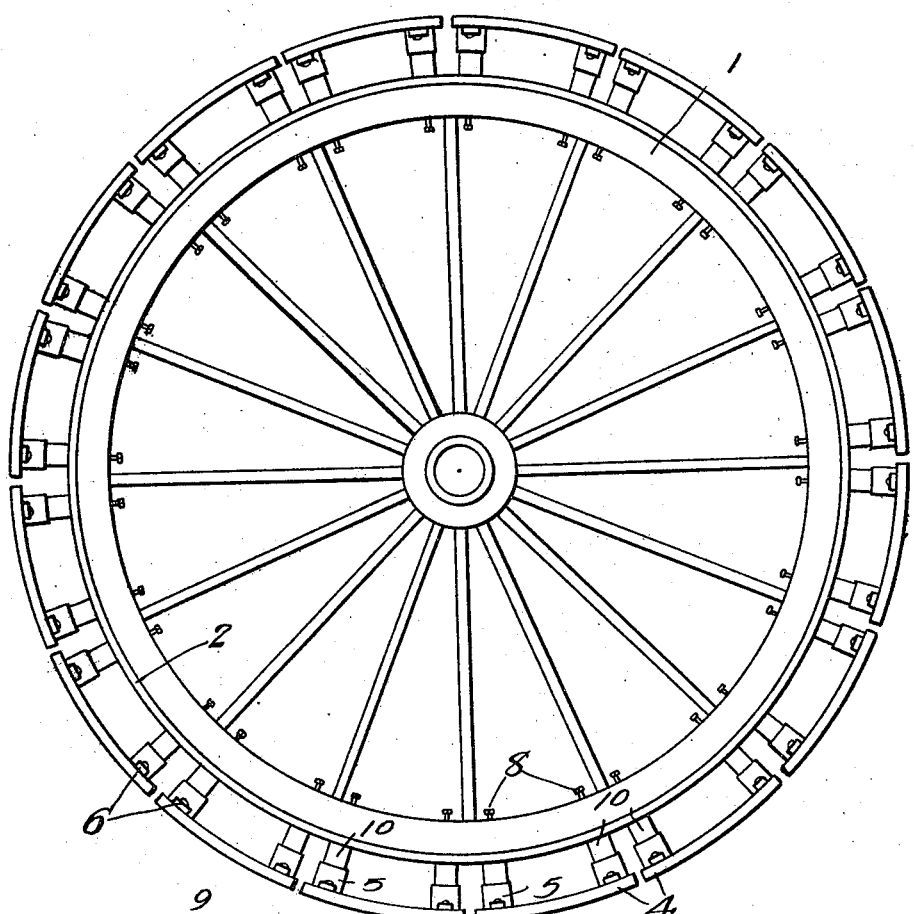
Figure 1 is a side elevation of my improved spring wheel.
Figure 2:
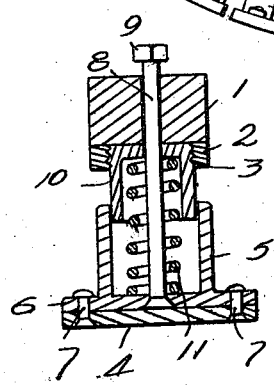
Fig. 2 is a fragmentary transverse section therethrough.

Referring now more specifically to the several figures of the said drawings, there is provided the ordinary wheel, including a hub, radiating spokes and rim, designated in its entirety by the numeral 1 and having arranged upon the peripheral surface thereof a rim band 2 in which there is formed at suitable intervals a plurality of radially disposed screw threaded openings designated 3. Other openings extend radially from the screw threaded openings 3 in the rim band 2, for a purpose which will be subsequently apparent.

An outer rim 4 is provided and comprises a plurality of segments, the adjacent edges of which are so arranged as to permit independent movement thereof.

A plurality of cylindrical cups 5 having diametrically arranged apertured lugs 6 formed upon the bottoms thereof are secured to the opposite extremities of each of the segments of the outer rim 4, by passing rivets 7 or other suitable fastening devices through said apertured lugs into engagement with the various segments. Radially disposed guide rods 8 are rigidly seated within the bottoms of the cups 5 and project through the radial openings formed in the rim of the wheel 1, screw threads being arranged upon their inner extremity whereby locking nuts 9 may be turned into engagement therewith for an obvious purpose. Other cups 10 having the base portions thereof screw threaded are turned into engagement with the screw threaded openings 3 formed in the rim band 2 and when so positioned telescope within the alined cups 5. Expansible coiled springs 11 are arranged within the telescoping cups 5 and 10 and are preferably received about the guide rods 8, thus serving as means for yieldably maintaining the segments of the outer rim 4 in their normal positions.

From the foregoing, it will be appreciated by workers in the art, that I have provided an exceedingly simple and efficient spring wheel, and one which will fully absorb such shock as may be transmitted thereto during travel of the same over rough or uneven surfaces, the various springs 11 as arranged within the telescopic cups 5 and 10 serving as cushioning means.

Obviously, the construction shown is capable of considerable modification and such modification as is within the scope of my claim, I consider within the spirit of my invention.

I claim:

In a spring wheel, an inner rim having a plurality of spaced apart radially disposed openings formed therein, a band arranged about the inner rim, said band being provided with a plurality of screw threaded pockets alined with the radially disposed openings, cups having apertured bottoms turned into engagement with said screw threaded pockets, a segmental outer rim, pairs of cups secured to the segments of the outer rim adjacent their opposite ends and telescopically engaged with said first cups, radial guide rods secured to the second cups and extending through the apertured bottoms of the first cups and the adjacent radial openings in the inner rim, and coiled springs arranged in said telescopically engaged cups.

In testimony whereof I affix my signature hereto.

THOMAS MEEHAN.